(12) United States Patent
Kohlndorfer et al.

(10) Patent No.: US 6,419,178 B1
(45) Date of Patent: Jul. 16, 2002

(54) SEAT BELT RETRACTOR WITH INTEGRALLY FORMED FRAME

(75) Inventors: Kenneth H. Kohlndorfer, Roseville; Richard A. Boelstler, Lake Orion; David R. Arnold, Macomb Township, Macomb County; Wendell C. Lane, Jr., Romeo; Susan A. Richards, Sterling Heights; Markell Seitzman, Orchard Lake, all of MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/619,112

(22) Filed: Jul. 19, 2000

(51) Int. Cl.[7] .............................................. B65H 75/48
(52) U.S. Cl. .................... 242/379.1; 280/805; 280/806; 280/807
(58) Field of Search ............................ 242/379, 379.1; 280/805, 806, 807; 297/478, 471, 472

(56) References Cited

U.S. PATENT DOCUMENTS

| | | | | |
|---|---|---|---|---|
| 4,485,986 A | * | 12/1984 | Sugimoto | 242/379 |
| 5,904,371 A | * | 5/1999 | Koning | 280/806 |
| 6,267,315 B1 | * | 7/2001 | Blackadder et al. | 242/384 |

* cited by examiner

Primary Examiner—John Q. Nguyen
(74) Attorney, Agent, or Firm—Markell Seitzman

(57) ABSTRACT

A seat belt retractor (20) characterized by low mass and low operating noise, resistant to dust, moisture, and corrosion comprising: an integrally formed, quadrilaterally shaped main body portion (24). In the preferred embodiment, the frame is injection molded using 50% or greater long glass fiber plastic or die cast or injection molded metal. A spring housing wall and wall of a mechanism cover are also integrally formed in the sides of the retractor. Positioned within the spring housing wall is a spring coil guide, as well as an integrally formed anchor, which is used to hold the outer end of a rewind spring. The mechanism side of the frame further includes an integrally formed post or pin to pivotally support a locking pawl.

16 Claims, 15 Drawing Sheets

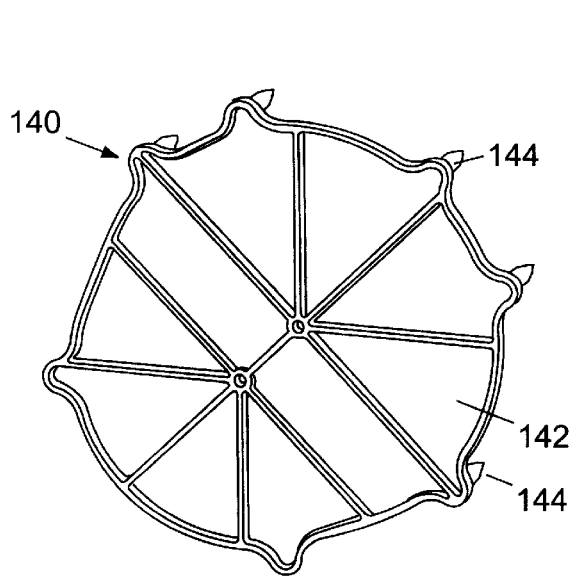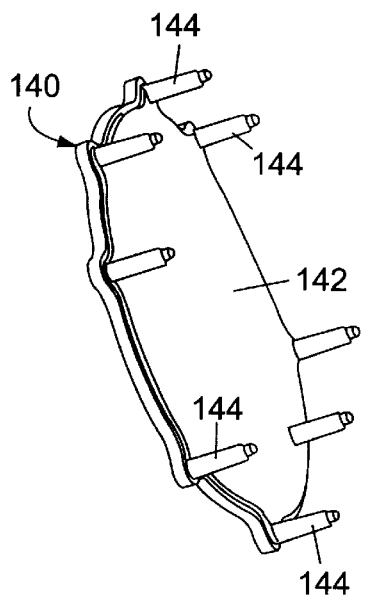
Fig. 9a Fig. 9b
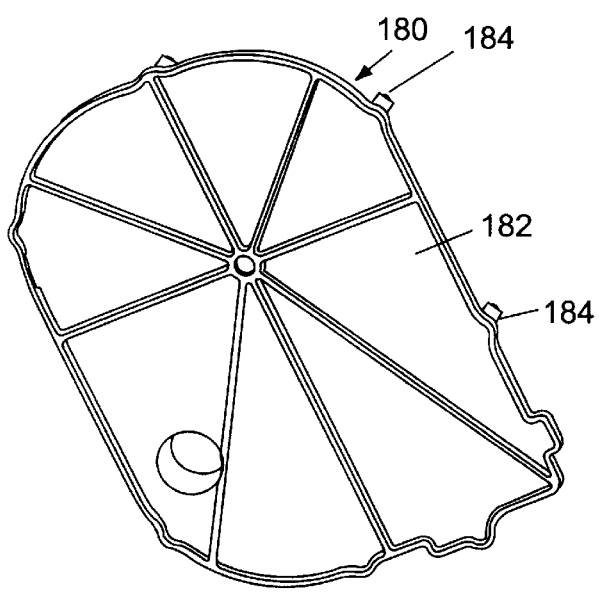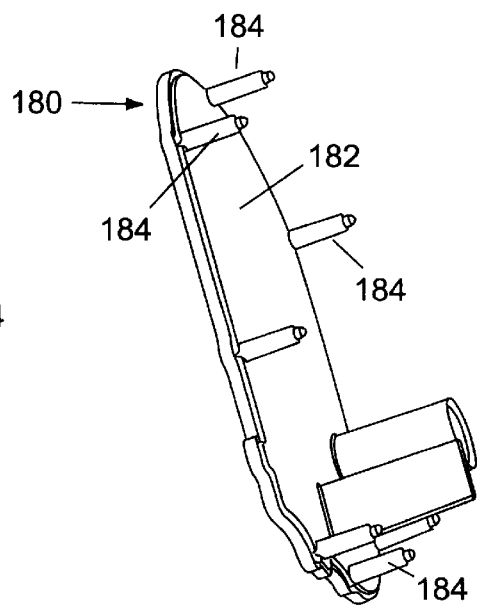
Fig. 10a Fig. 10b

SEAT BELT RETRACTOR WITH INTEGRALLY FORMED FRAME

BACKGROUND AND SUMMARY OF THE INVENTION

The invention generally relates to seat belt retractors and more particularly to a seat belt retractor having a molded frame with various integrally formed features.

The typical seat belt retractor comprises a metal, load-bearing frame. The frame, at least in the vicinity of the retractor spool or shaft, has a U-shaped body. The frame will also include an upper and lower extension, which are used to attach the retractor to a mounting surface(s). The sides of the U-shaped body are almost universally held together by separate tie bars, cross pieces or struts that span the opposite sides of the frame. Each side of the frame includes an opening that serves as a bushing for the retractor spool or shaft or a separate bushing can be inserted in each opening. Typically, a separate spring housing or spring cassette is attached to one side of the frame. The spring housing encloses a rewind spring, which rewinds the seat belt onto the retractor spool. The center of the spring drives the spool or shaft of the retractor. The other frame side supports the various control mechanisms used to initiate the lock-up of the retractor in an emergency. These control mechanisms include initial sensors such as the vehicle sensor and web sensor, which are located within a separate mechanism housing that is attached to this other frame side. Depending on the design of the retractor, the mechanism housing may also enclose a lock dog (or lock pawl) and an associated lock wheel. The spring housing and mechanism housing are typically made of plastic and secured using snap features or other connectors, in a known manner, to a corresponding frame side. As is also known in the art, the spring housing and mechanism housings are formed with many openings. One disadvantage of this type of construction is that dirt, dust and liquids can easily flow through these openings into these housings, as well as other openings in the frame, and contaminate the spring, sensors and other parts of the retractor. As can be appreciated, moisture easily enters the housings and affects the parts therein. Further, the use of the above-mentioned tie bars, cross pieces or struts and other separate components, including the separately attached spring and mechanism housings, mounting members, and frame parts, increases the parts count, lowers the reliability of the product, increases the possibility of incorrect assembly, and complicates the assembly process. As can be appreciated, an increased number of separate parts in the retractor will increase the overall cost and weight of the retractor.

The present invention reduces part count, increases dimensional control and lessens dimensional variation within a retractor, which provides for improved performance and reliability. Additionally, by using various features that are integrally and simultaneously formed as part of the frame, the orientation of the individual components can be more closely controlled. Additionally, by forming the retractor with many integrally formed elements, the need to mistake-proof the manufacturing process is eliminated (as these features are automatically and properly oriented in the integrally formed frame).

A key criterion used to measure the performance of any seat belt retractor is the degree of noise, buzz or rattle produced. The importance of having a quiet seat belt retractor is magnified if the retractor is installed in a seat and positioned near the top of the seat. As can be appreciated, this mounting location places the retractor in close proximity to the occupant's ear, making it more difficult to muffle any noise. Further, the use of a metal frame (which is not the case with the preferred embodiment of the invention), as known in the prior art, serves to amplify noise.

It is an object of the present invention to reduce the number of discrete parts used in the manufacture and assembly of a seat belt retractor. An added object of the invention is to provide a retractor that has improved resistance to dust, corrosion and moisture. A further object of the present invention is to manufacture a seat belt retractor that includes a fiber reinforced, resin (or plastic) molded or cast frame. An additional object is to integrally mold, as part of the frame, a number of the secondary retractor components such as part of a spring and a mechanism housing.

A further object of the present invention is to provide a seat belt retractor with a reinforced resin or plastic frame that is capable of withstanding and exceeding the 1136 Kg (2,500 pound) empty spool, pull test defined in FMVSS 209.

Accordingly the invention comprises: a seat belt retractor characterized by good dust, corrosion and moisture resistance, as well as low operating noise. The retractor comprising: an integrally formed, main body portion and at least one integral mounting member. In the preferred embodiment of the invention, the frame is molded using a fiber reinforced plastic or resin having glass fibers in excess of 10 millimeters in length and/or a glass content by weight of more than 50% with an average net length of more than 2000 microns. The main body can optionally include a spring housing wall and mechanism housing wall. An integrally formed spring retainer is used to hold the outer end of a rewind spring. The mechanism side of the frame further includes an integrally formed post or pin to pivotally support a lock pawl. The integrally formed post is permitted to flex under the normal loads achieved during retractor lock-up during an accident. The frame further includes a mechanism stop, which receives a portion of the lock pawl as the post flexes. This stop prevents excessive motion of the post and is also helpful to distribute locking reaction forces across various portions of the frame.

Many other objects and purposes of the invention will be clear from the following detailed description of the drawings.

BRIEF DESCRIPTION OF THE DRAWINGS

In the drawings:

FIGS. 9a and 9b are views of a cover for a spring housing.

FIGS. 10a and 10b are views of a cover for a mechanism housing.

DETAILED DESCRIPTION OF THE DRAWINGS

Figure 1:
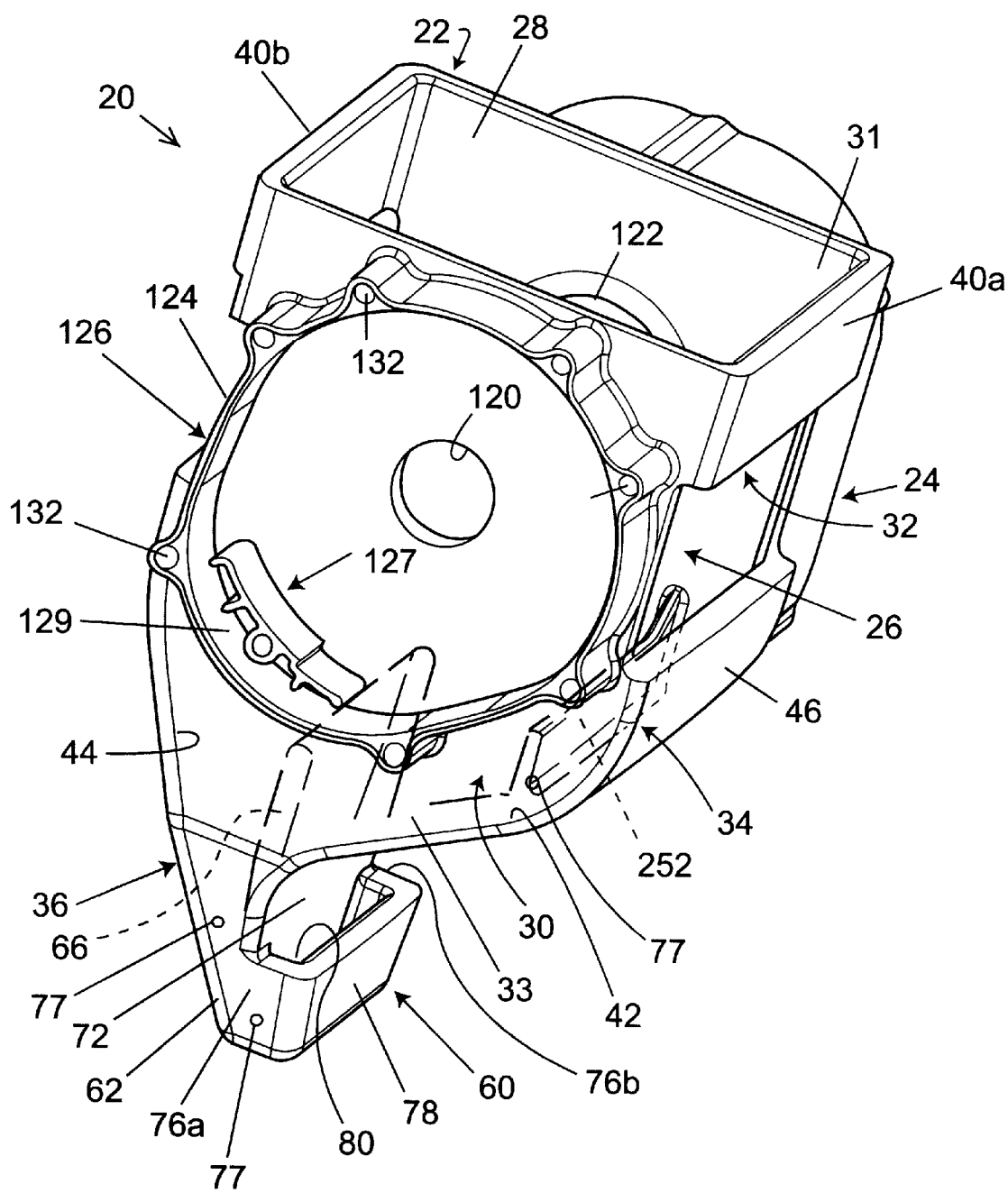
FIG. 1 illustrates an isometric view of the frame of the present invention.
Figure 2:
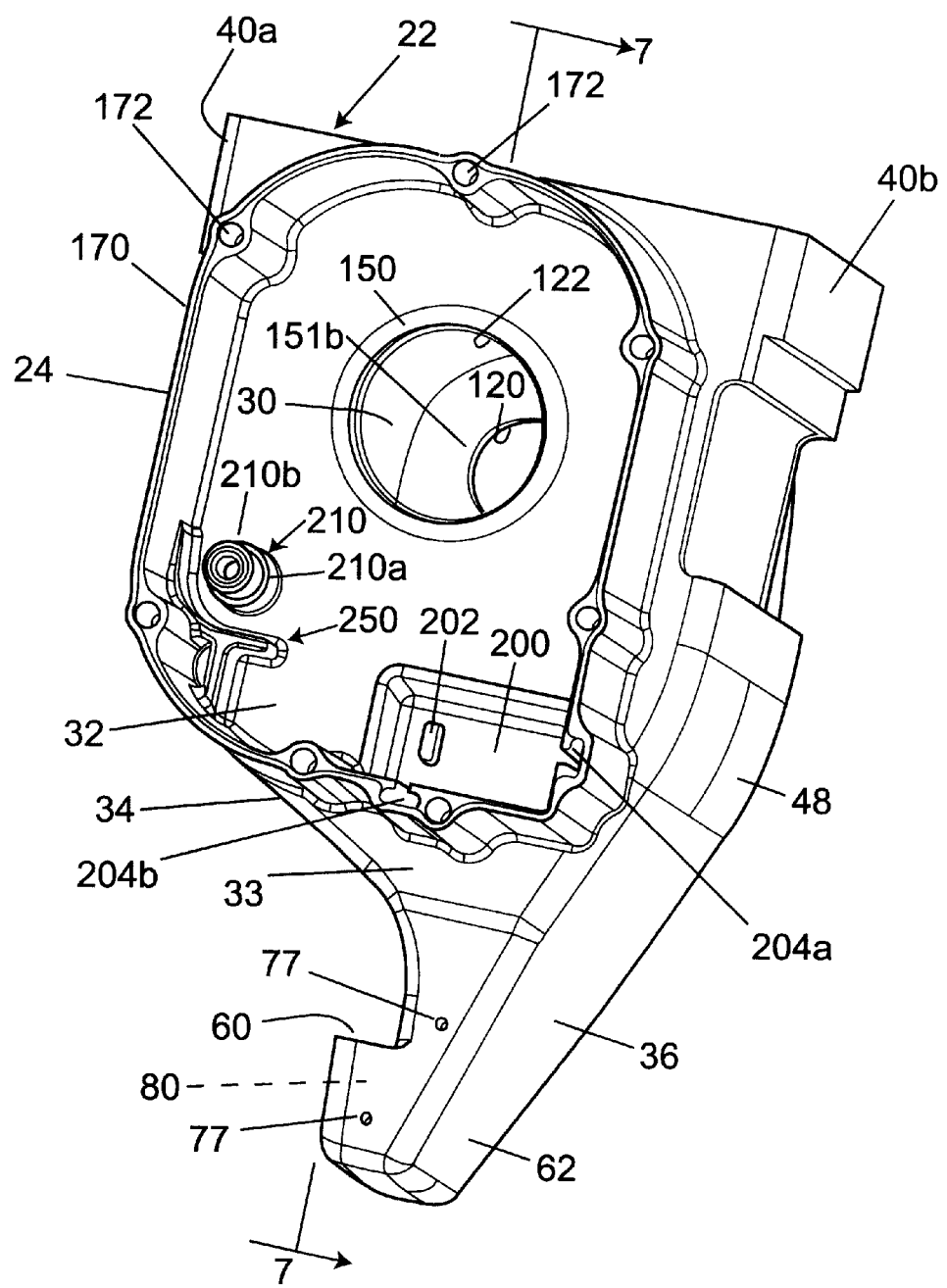
FIG. 2 illustrates another isometric view of the present invention.
Figure 3:
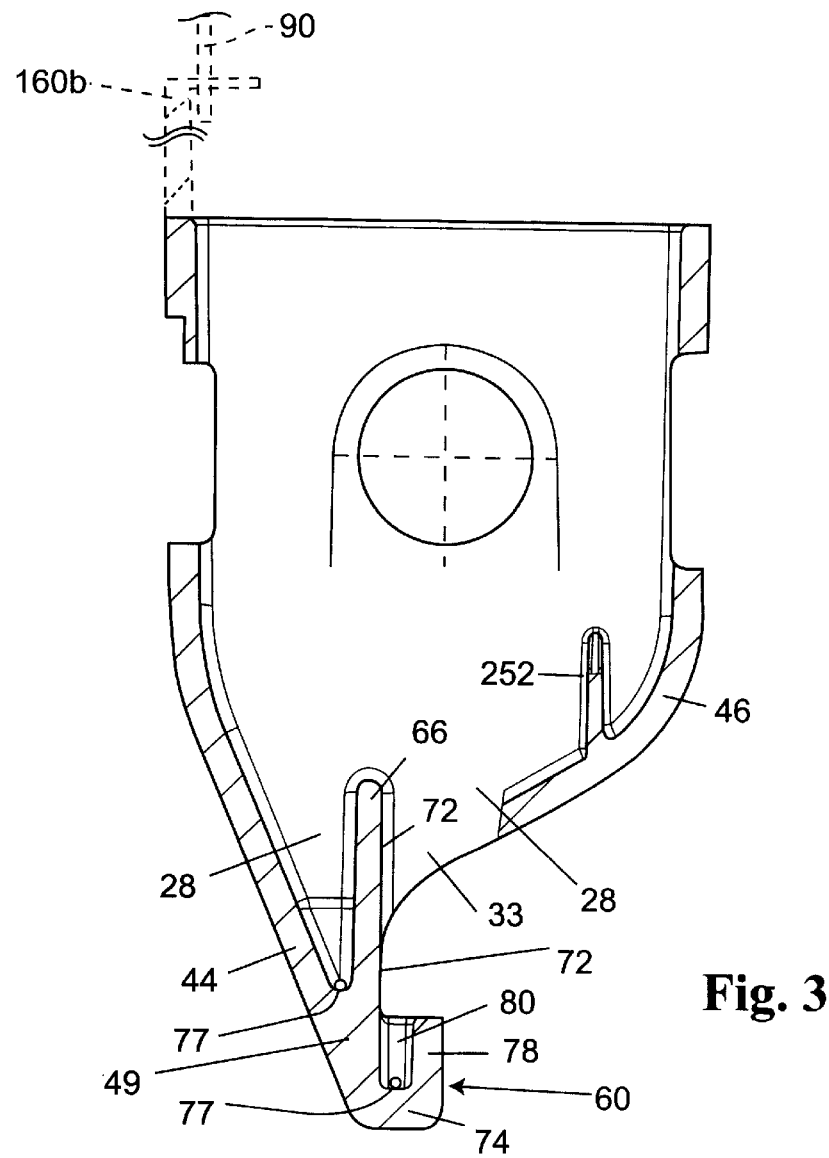
FIG. 3 is a partial cross-sectional view showing a mounting member or feature that is integrally formed as part of the retractor frame.
Figure 4:
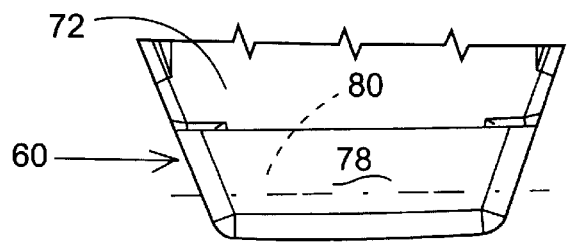
FIG. 4 is a partial plan view of the mounting member of FIGS. 1 and 3.

The major components of the present seat belt retractor 20 include a frame 22 and a torsion bar/spool assembly 300 (see FIG. 13) about which is wound a length of seat belt webbing (also referred to as the seat belt). FIGS. 1 through 4 illustrate various views of the retractor frame 22. The frame is preferably made from injection molded, glass reinforced thermoplastic with a concentration of at least 50% to about 70%, long glass (about 10 mm) fibers in a nylon resin. Carbon or aramid fibers may also be used to strengthen the resin (which can be an acetal or phenolic rather than nylon). Alternately, a thermoset plastic can be used as well as shorter length glass fibers (2–3 mm) in certain applications.

The frame 22 has a main body portion 24 and at least one mounting feature such as a lower mounting member 60. As illustrated, member 60 does not require a separate bolt or other fastener to mount the retractor. As described below, this mounting member serves to anchor the retractor to a mounting surface or structure, such as a pillar or seat member. The main body 24 is generally quadrilateral in shape and defines an internal cavity or chamber 26 with an open top 28 through which various retractor components, such as the spool, are received during assembly.

The main body includes a first or spring side 30 and a second or mechanism side 32. Various struts or cross pieces integrally join the sides to provide strength, prevent warping, and insure proper orientation of the frame and its components. Some of these cross pieces form a rear side 34 (outwardly facing in relation to its mounted position in relation to a vehicle pillar) and other cross pieces form a front side 36 (inwardly facing). The designation of the front and rear sides will change if the retractor is installed in a reverse manner. The top 31 of each of the sides 30 and 32 are generally rectangularly shaped and are joined by upper rear and front struts or cross pieces 40a and 40b to form the open top 28. As can be seen, the lower portions 33 of the right and left sides are curved to permit the frame to fit within a smaller space than if the lower portions were rectangular. The rear or outer edge 42 of each lower portion 33 is more dramatically curved (and rear side 34) than the front or inner edge 44 (and front side 36).

The lower, curved outer edges 42 of each of the right and left sides are connected by an integrally formed lower rear strut or cross piece 46 (which forms rear side 34) which extends along only a portion of each outer edge 42. As can be seen, the strut 46 (see FIG. 1) is spaced from the upper strut 40a and from the mounting member 60. The sides 30 and 32 are also connected by a longer, lower front strut or cross piece 48 (which forms front side 36, see FIG. 2) which runs along front edges 44 of each frame side. The strut 48 is spaced from strut 40b and extends down to the mounting member 60 and also forms the front wall 62 of the mounting member 60.

The frame 22 further includes an intermediate lower strut 66, which connects the lower portion 33 of the sides 30 and 32. As discussed below, this intermediate strut 66 generally extends perpendicularly to the bottom 74 of the mounting member 60. When the lower mounting member is stressed, the strut 66 assists in distributing these forces to the integrally formed frame sides 30 and 32. The lower portion of this intermediate strut 66 forms a first rear (rear facing) wall 72 of the mounting member 60. Additionally, the struts 48 and 66 integrally come together in the vicinity (see numeral 49 in FIG. 3) of the mounting member to provide increased strength across this portion of the mounting member.

The details of the mounting member 60 can be seen in FIGS. 1–4. The mounting member 60 is basket-like or hook-like with a bottom 74 and walls or sides extending upwardly from the bottom. As mentioned, one of these walls is formed by wall 72 of the lower portion of the intermediate strut 66. The lateral walls or sides 76a and 76b are formed by the extreme lower portions of the sides 30 and 32. A low profile, second rear facing wall 78 connects the sides 76a and 76b to the bottom. The various components of the mounting member 60 define a structure-receiving cavity 80. The shape of the cavity 80 can be seen in FIGS. 3 and 4. Walls 72, 78 and bottom 74 form a hook, which is mated with a part 98 or insert 100 associated with the mounting structure 90 (typically one of the B or C pillar of the vehicle or a seat frame member (see FIG. 5a). The walls 76a and 76b can be eliminated, if not needed for structural support in certain applications, which will give the mounting member 60 a more hook-like shape. The frame 22 may optionally include integrally formed drain holes 77 in the bottom of the cavity 80, or at the intersection of side 36 and strut 66 and/or at the bottom of strut 252 (see below) and side 34 (see FIGS. 1 and 3).

Figure 5A:
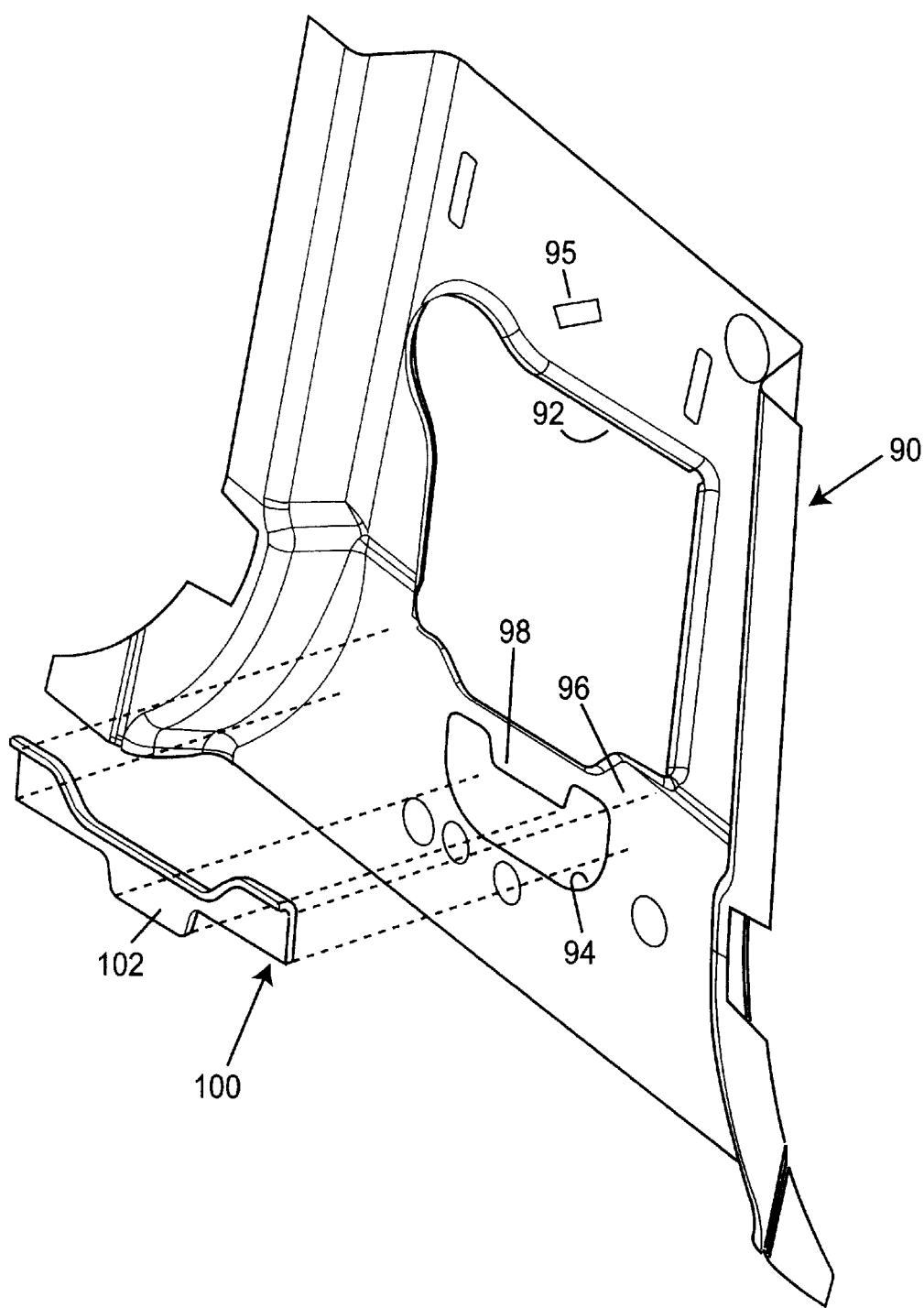
FIG. 5a shows a typical mounting structure such as a B-pillar.
Figure 5B:
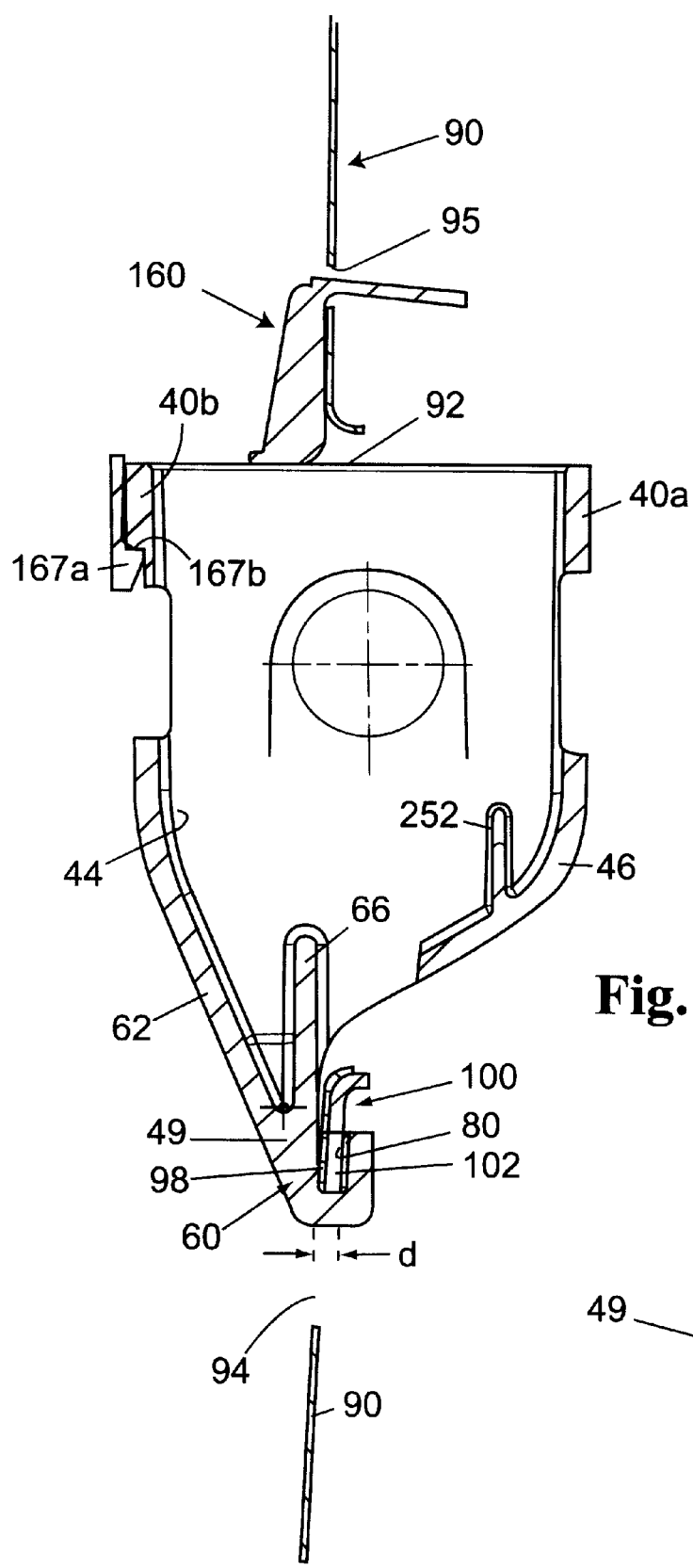
FIGS. 5b and 5c show various views of the retractor within the mounting structure.
Figure 5D:
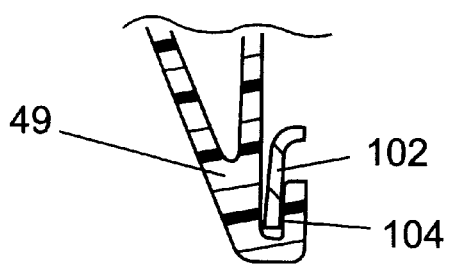
FIG. 5d shows a variant of the invention.
Figure 5C:
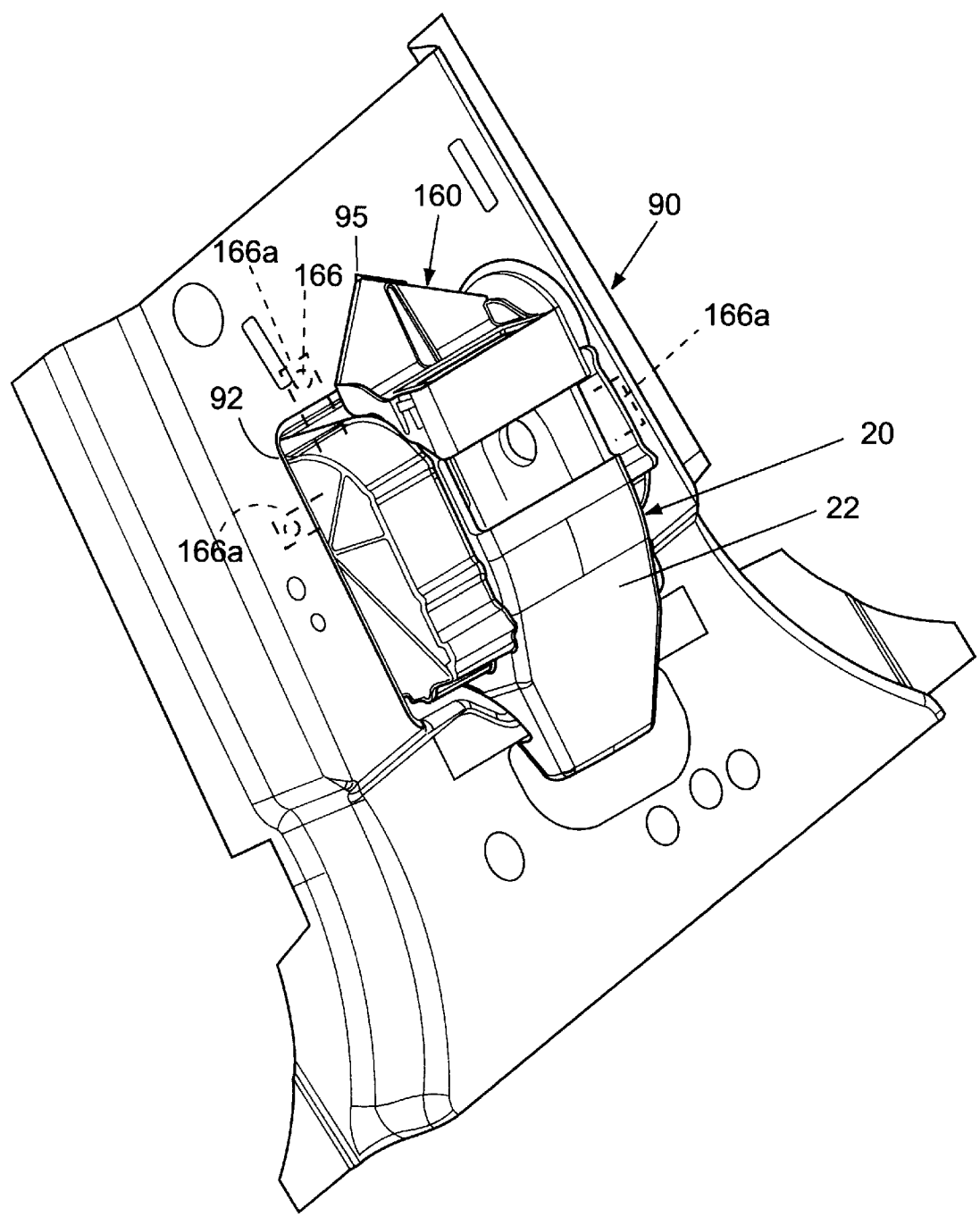

The mounting surface 90 is formed with a first opening 92 of sufficient size to receive the retractor frame 22 as shown in FIG. 5c. It is quite common for a retractor to be recessed within an opening of the mounting structure 90. FIG. 5a is a view looking toward the interior of the passenger compartment (from the outside of the vehicle) and shows the rear or hidden side of the B-pillar. FIG. 5b is a cross-sectional view showing the retractor frame in the structure (B-pillar) 90. The spool and other components of the retractor are not shown. FIG. 5c is an outwardly facing isometric view of the retractor 20 within the structure 90. In the present invention, the mounting structure includes a second opening 94 that is sufficient to receive a portion of the mounting member 60. An intermediate structural portion 96 of structure 90 separates the two openings 92 and 94. This intermediate portion 96 of the pillar can be formed with an optional depending or mounting part 98 that extends into opening 94. If used, the part 98 is preferably shaped to conform to the shape of the cavity 80 of the mounting member 60 so that it is easily and tightly received therein. In the preferred embodiment of the invention, the depth d (see FIG. 5b) of the cavity 80 of the mounting member 60 is about 4 mm. If this dimension is larger than the thickness of the depending part 98 (a vehicle pillar is typically formed of thin sheet metal) of the mounting structure 90 and an insert 100 is used to prevent the retractor frame from rattling upon the mounting surface. It is contemplated that the insert 100 will be attached to the intermediate portion 96 of the structure 90, to reinforce same by welding or by using separate fasteners. The insert 100 can be a formed metal, powdered metal or cast metal part with a projecting tip 102. The exterior shape of the tip 102 matches the shape of the cavity 80 (or hook) of the mounting member 60. As can be seen in FIG. 5b, the tip 102 and depending part 98, if used, fit tightly in the cavity 80. The combined thickness of the tip 102 and part 98 is preferably equal to the depth d, of the cavity or hook 80. If the structure 90 does not include part 98 or is not positioned behind the tip 102, the thickness of the tip 102 is appropriately increased. FIG. 5d shows a further alternate of the invention in which the cavity 80 is filled with or includes a resilient material 104, which securely holds the tip 102 in place and further acts as a vibration and sound attenuator.

In the preferred embodiment the assembled retractor 20, with seat belt webbing attached, is inserted within the openings 92 and 94. The retractor 20 is moved upwardly until the part 98 or insert 100 is located precisely within the cavity 80 of the mounting member 60. Thereafter the top of the retractor 20 is secured to a mating portion of the vehicle structure 90 using an upper mounting member. This upper mounting member basically insures the proper alignment of the retractor (prevents rotation). As can be appreciated, virtually all of the restraint forces (which are directed upwards, are absorbed at the lower mounting member 60.

Figure 6A:
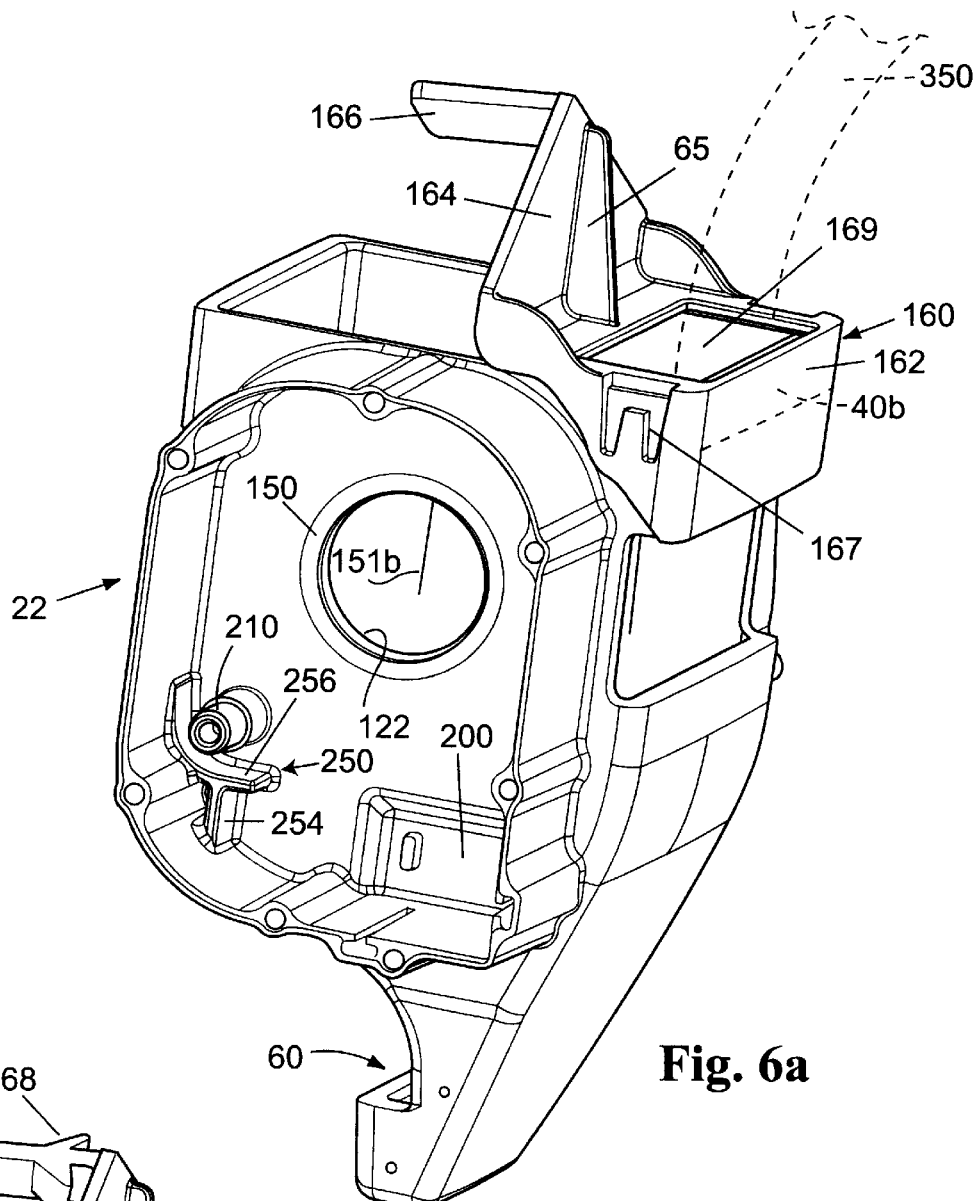
FIG. 6a shows an alternate embodiment of the frame with an integral upper mounting member.
Figure 6B:
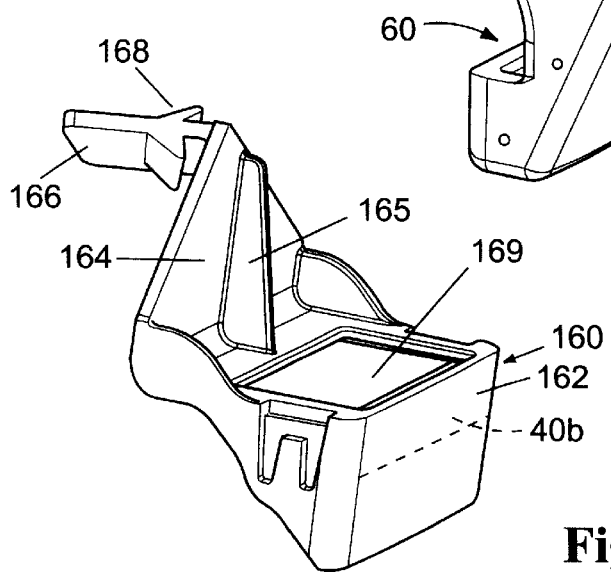
FIG. 6b shows another embodiment of the invention.

Reference is made to FIG. 6a and again to FIGS. 5a–5d. FIG. 6a shows an upper mounting member 160 that is snapped to and retained to the upper strut 40b. This snap feature eliminates the need for a separate fastener. The upper mounting member 160 includes a lower, open frame-like portion 162 that snaps upon the top of the main body 24 about strut 40b. The interior of portion 162 is hollow, forming an integral opening or web guide 169. The seat belt 350 (shown in phantom line) extends from the retractor spool (not shown in FIG. 6a) and exits through the web guide 169. The sides of the upper mounting member 160 are formed with snap features 167 and/or 167a that mate with like snap features 167b (see FIG. 5b) on the strut 40b and/or on the top ends of frame sides 30 and 32. The construction of this type of snap-fit feature is known in the art. Member 160 additionally includes an upwardly extending arm 164 supported by integral reinforcements or ribs 165 and a finger 166 that extends rearward from arm 164. Finger 166 is received within an opening 95 in the mounting structure (pillar) 90. The location and height of the arm 164 will vary with the shape of the mounting structure 90. As can be appreciated the arm 164 positions the finger properly relative to the structure 90. As shown, the finger 166 is a flat rectangle (opening 95 also generally rectangular) and is oriented at an angle (about 5–10 degrees) relative to the placement of arm 164 (which as shown is vertical). The flat finger 166 is also rotated about a horizontal axis to align with the placement of opening 95. The shape of the finger could vary and include a star shape, or circular profile, etc. In that case the opening 95 would be correspondingly shaped. The finger 166 may also include a snap-in or self-locking feature 168. As illustrated in FIG. 6b, this feature 168 includes a deformable set of tabs or ridges, which interlock with a mating opening in structure 90. In the preferred embodiment the upper mounting member is also plastic.

Prior to installation of the retractor to the mounting surface or structure 90, the spool of the retractor is first installed upon the frame before the upper member 160 is attached thereon. The seat belt webbing that is wound on the spool is passed out of the web guide 169 formed in the upper mounting member 160. Thereafter, the lower mounting member 60 is positioned in opening 94 with the tip 102 within the cavity or hook 80. With the lower mounting member 60 in place on the mounting structure 90, the finger 166 is pushed through opening 95. The upper part of the retractor frame will be held in place in view of the downward bend of the finger 166. Alternately, if the finger includes the self-locking features 168, after the self-locking features 168 have been pushed through a complementary shaped opening 95, they provide a press-fit or locking fit, trapping the sheet metal of the mounting structure 90 between the tabs 168 and the back of the extending arm 164.

As can be appreciated, the upper mounting member 160 can also be integrally formed as part of the retractor frame. This mounting member 160 can take various shapes and can be positioned at various locations on the frame. Here an integrally formed mounting member 166a, with the above bent-over configuration or self-locking features, can extend from the spring and/or mechanism housings (see FIGS. 2 and 5c). The mounting member 166a is also received through an associated opening such as 95 or the like. In a further embodiment, the upper mounting member 160b can also as an integral extension (see FIG. 3) of any of the frame sides or its front or rear surfaces.

Figure 7:
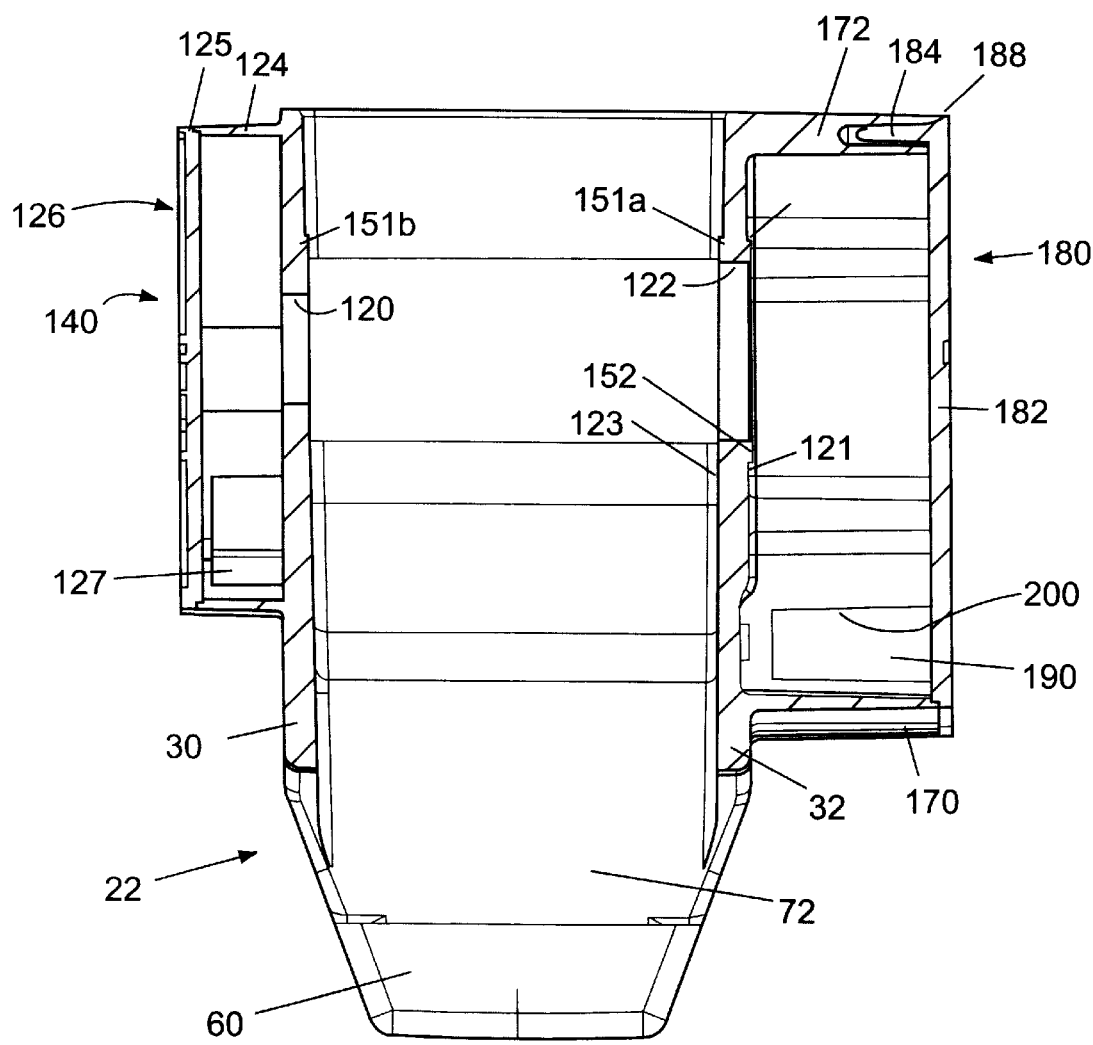
FIG. 7 is a cross-sectional view of the frame taken through Section line 7—7 of FIG. 2.
Figure 8:
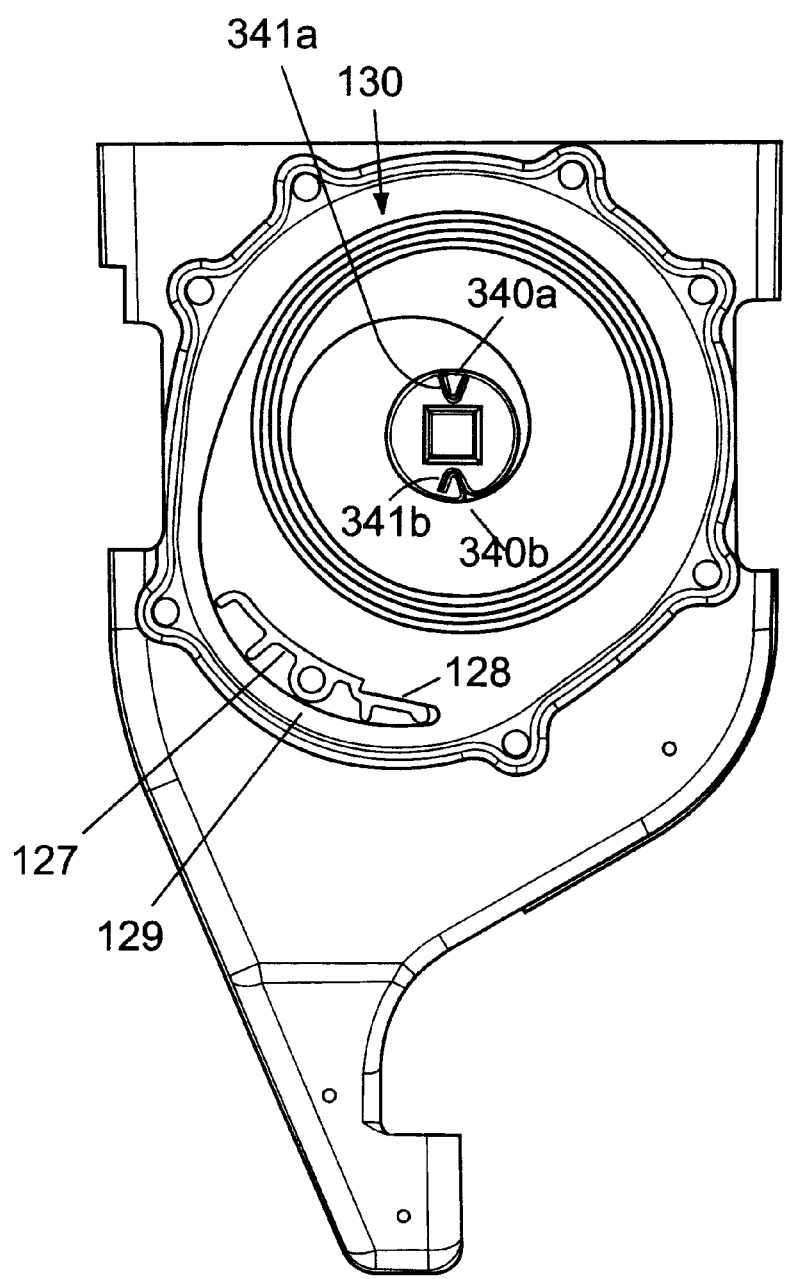
FIG. 8 is a plan view showing an integrally formed spring cup or cavity and rewind spring with the frame.

Reference is again made to FIGS. 1 and 2 and to FIG. 7. Frame sides 30 and 32 each include a respective opening 120 and 122 through which various parts of a spool assembly are received. Frame side 30 also includes an integrally formed wall 124 that defines a spring cup or cavity and also forms a portion of a spring housing 126. The wall 140 is generally circular in shape. Integrally formed on frame side 30, within wall 124, is a spring retaining member 127 which is used to engage the outer end 128 of a flat rewind spring 130 (see FIG. 8). Member 127 is also spaced from the wall 124 (see spacing 129 in FIGS. 1 and 8) to allow the spring to pass therebetween. FIG. 8 is a plan view showing the frame side 30, wall 124 and spring 130 with its outer end 128 received in member 127. A spring arbor 337 is connected to the inner end of the spring 130.

The wall 124 is formed with a plurality of first press fit fastening features 132 distributed about the wall 124. These first press fit features have integrally formed narrow diameter bores, which receive mating fingers 144 of a spring cover or cap 140.

The spring cover cap 140 is shown in FIGS. 9a and 9b. FIG. 7 shows the cap 140 in place upon wall 124 of frame 22. The quality of the seal between the cap and the wall 124 is improved because of overlapping joints 125 (rabbit joint). Additionally, the high flexural modulus (20,700 Mpa; 3,000 000 psi—dry as molded) of the frame material enhances the stability (rigidity) of the seal and prevents warping and deformation that might result because of the constant outward pressure on wall 124 produced by the rewind spring 130. The spring cap includes a generally flat plate, body or cap portion 142 with a plurality of press fit/interference fit features such as fingers 144. While not shown in detail, each finger is tri-lobular in cross-section. Each one of the fingers 144 is inserted within a corresponding snap feature 132 to provide for a press fit connection of the spring cap 140 to the wall 124. The tri-lobular profile assists in tightly securing the cap to the wall.

As mentioned, side 32 includes opening 122. In the illustrated embodiment, opening 122 is of larger diameter than opening 120. The relative sizes of the openings 120 and 122 will vary with the features of the spool assembly. Frame side 32, on its outer surface 121, about opening 122, includes an upraised rim 150 which prevents a lock wheel (see FIG. 13) and related parts from rubbing on the flat frame side 32. The inner surface 123 of frame side 32 includes an integral, angularly extending wall segment 151a, about opening 122 which provides a stand-off for a closely spaced retractor spool flange (not shown in FIG. 7). The inner surface 123 of wall side 30 also includes a similar wall segment 151*b*, about opening 120. The rim 150 reduces rubbing friction with a lock wheel. Additionally, as more clearly shown in FIGS. 2 and 7, side 32 is formed with an integrally extending wall 170, which forms a part of a mechanism housing 190. The wall 170 further includes receiving members 172, similar to members 132, to secure a mechanism cover 180 thereto. The mechanism cover or cap 180, as shown in FIGS. 10*a*, 10*b* and 7, includes a plate or body portion 182 and projecting fingers 184. The plate 182 and wall 170 also form an overlapping or rabbit joint 188 which effectively prevents dust and other matter from entering into the mechanism side housing 190 that is formed by the cap 180 and wall 170. The cap 180 is made of a sound-absorbing material such as polypropylene or similar material.

The frame side 32 further includes a recess 200 near the lower portion of the wall 170. Extending outwardly from this recessed portion 200 is an optional small tab 202. There are no holes through this recess to prevent contaminates from entering. The recess 200 receives a portion of a vehicle inertial sensor (not shown in FIG. 2). The tab 202, if used, functions as a stop and abuts a portion of the vehicle sensor housing and prevents the housing from moving sideways. The wall 170, adjacent the recess 200, includes two slots 204*a* and 204*b* (see FIG. 2) which mate with complementary shaped projections on the inertial sensor to permit the sensor to be slipped into position within the wall 170. Once the wall 170 is covered by the cover 190, the only opening into the housing 190 is through opening 122. The cover lightly presses on the vehicle sensor housing to keep it in place. As can be appreciated, this type of construction, in combination with the mechanism housing cover 180, minimizes the openings in the frame adjacent the sensor thus isolating the sensor from the local environment.

As will be seen below, the illustrated retractor 20 includes a single sided locking mechanism. The present invention can also be used in a dual sided locking mode in which two lock wheels are used and located on opposite sides of the frame (typically located adjacent the inner surfaces of the frame sides near the openings 120 and 122). To lock the retractor, a rotatable lock pawl is used and is moved into contact with teeth of a lock wheel. As known from the prior art, the lock pawl rotates about a pin. One such pawl and locking mechanism is shown in U.S. Pat. Nos. 5,904,371, 5,511,741 or 4,564,154, which are incorporated herein by reference. In the present invention, a cylindrical pin 210 (see FIGS. 2 and 11*a*) is integrally molded as part of the side 32. The pin has a base 210*a* that has a larger diameter than a top cylindrical part 210*b*. The pin is designed to purposely flex in response to locking forces of the magnitude that are generated during a crash of a determinable level.

Figure 11A:
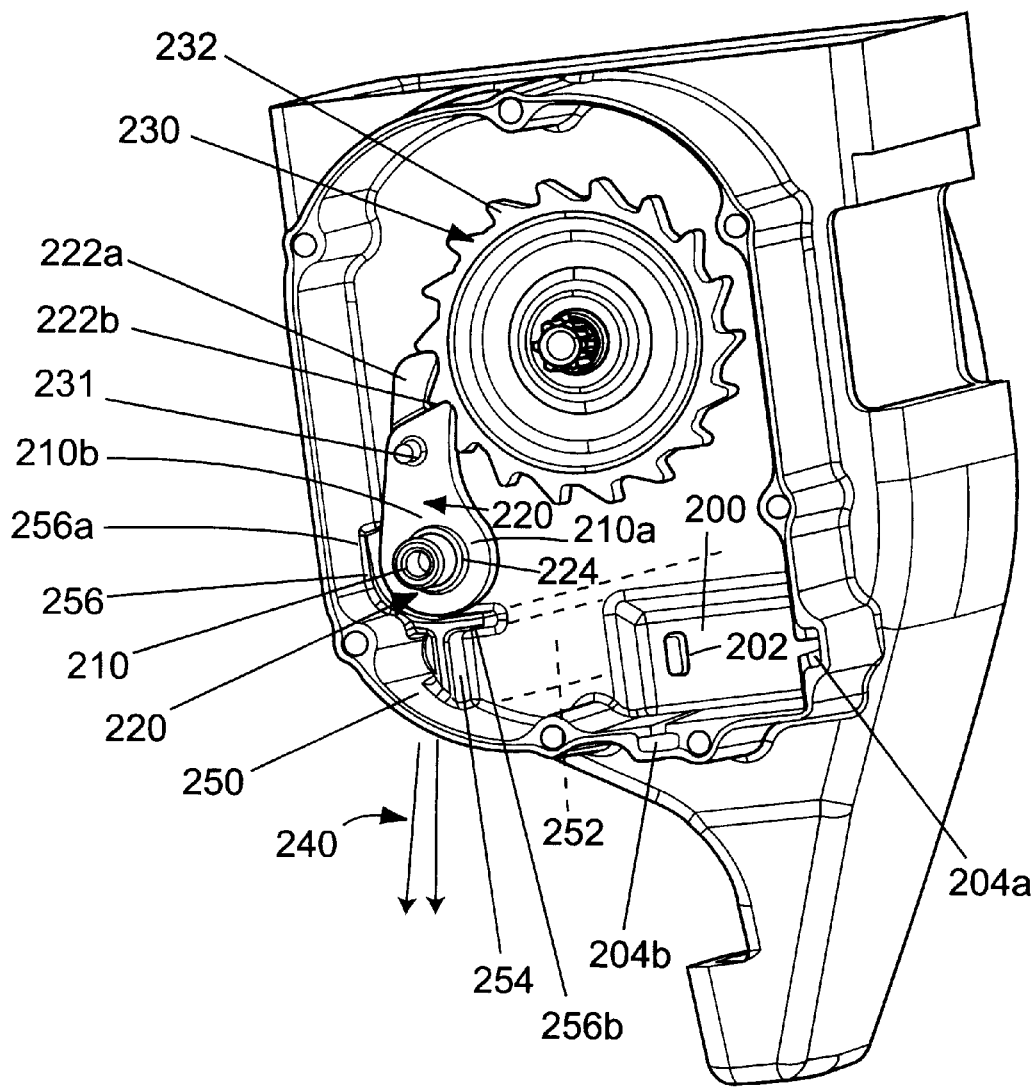
FIG. 11a shows a lock pawl and lock wheel in relation to the frame.
Figure 11B:
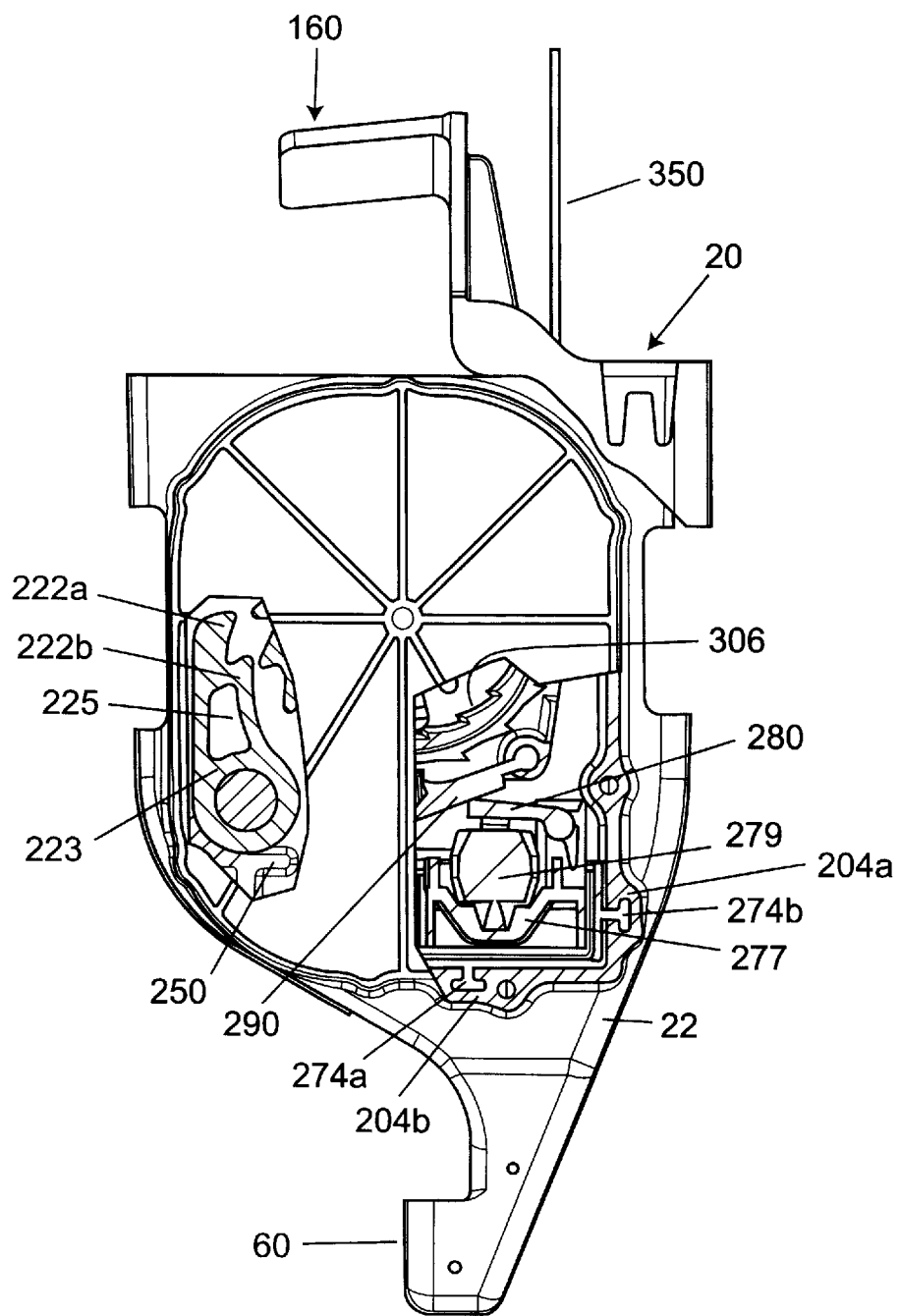
FIG. 11b is a plan view of the frame and mechanism housing and includes a cutout showing a lock pawl in relation to a lock wheel.

FIG. 11*a* is another isometric view of the frame 22 and also shows a lock pawl 220 on the pin 210. The pawl 220 is shown in locking engagement with teeth 232 of a lock wheel 230. The retractor 20 includes a cam-type mechanism (such as a known rotatable lock ring 310) that moves the lock pawl 220 from a free or unlocked position into engagement with the lock wheel 230. For example, the pawl 220 can include a cam follower pin 231. The lock ring is caused to rotate, about a retractor shaft part, under the influence of a web sensor or vehicle sensor in a known manner. The lock cup includes a cam, often in the form of a cam slot, to receive the cam pin 231. As the lock ring rotates, it moves the lock pawl into and out of engagement with the teeth of the lock wheel 230. As can be appreciated, other locking mechanisms can be used in the present retractor. As illustrated, the pawl 220 includes two locking teeth 222*a* and 222*b*, which engage two of the teeth 232 of the lock wheel. In this manner, the reaction forces are absorbed by two, rather than one set of mating teeth. While the pawl teeth are designed to simultaneously engage the mating lock teeth, if the manufacturing tolerances used are sufficiently wide the simultaneous mating may not happen. In these situations one tooth will engage and damage may result. In another embodiment of the invention, the body 223 of the lock pawl is made with a recess 225 (see FIG. 11*b*) which will permit the pawl body to flex under load. Consequently, if the manufacturing tolerances defining the frame, pawl and lock wheel are such that the lower pawl tooth 222*b* will initially impact the lock wheel, after this initial locking engagement is made, the pawl 220 will flex slightly and bring the other tooth 222*a* into engagement with another tooth of the lock wheel. This design insures that both lock teeth of the pawl will engage when the retractor is under a crash load. A benefit of this construction is that the pawl can be made from less costly material such as zinc die cast.

The pawl 220 additionally includes a circular bore, which serves as a bushing and is received about the base 210*a* of the pin 210.

The geometry of the pawl and lock wheel are arranged so that when the lock pawl is brought into engagement with the lock teeth, as illustrated in FIG. 11*a*, the reaction force components generated during lock-up will be in the general region defined by arrows 240.

The frame 22 further includes an integrally formed pawl and pin support mechanism 250. This support mechanism 250 includes an integrally formed cross member or strut 252 (see FIGS. 1, 3, 5*b* and 11*a*). The strut 252 is formed on the inside of strut or cross piece 46 and links sides 30 and 32. Strut 252 includes an end piece 254 that projects from side 32. The mechanism 250 additionally includes a curved support member 256. One end 256*a* of member 256 extends from the inside of wall 170 to provide added strength and load distribution. The other end or side 256*b* of member 256 extends perpendicularly across the extending end piece 254 of strut 252.

When the retractor is locked, the pawl and lock wheel achieve the orientation shown in FIG. 11*a*. As the forces increase above a determinable level, they tend to distort the pin 210 and cause the lower portion of the pawl to move into contact with curved portion 256 of the support mechanism 250. These reaction loads or forces are then transferred to the projecting end portion 254 of strut 252 and then to strut 252 and distributed to the frame sides 30 and 32. In this manner the plastic frame can absorb the crash-induced forces.

Figure 12:
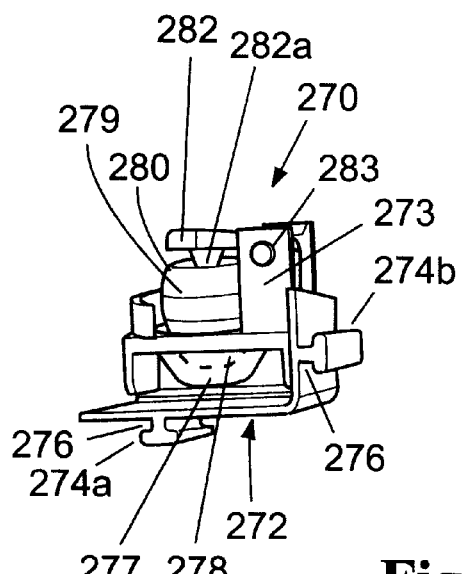
FIG. 12 shows the major features of an inertial sensor.

Reference is briefly made to FIG. 12 which shows the major features of a vehicle inertial sensor 270 that is received within the slots 204*a,b* and recess 200 of the frame 22. The sensor 270 includes a housing 272 with two posts or projection 274*a* and 274*b*. Each projection includes a neck or narrow portion 276 and an end portion. Each post is received within a respective slot 204*a* and 204*b*. The sensor 270 includes a support surface 277, which receives the lower end 278 of an inertial mass 279. The top 280 of the inertial mass 279 is recessed and receives an extension 282*a* of a sensing pawl 282. The pawl 282 is pivoted on a support 283, which may be an extension, such as parallel wings 273, of the housing 272. In some installations the pawl 282 can be placed so that it will contact a tooth of the ratchet wheel, in which case the end of the pawl is shaped as a tooth to engage the teeth of the ratchet wheel. As illustrated, the retractor 20 includes a second pawl 290 that is positioned above pawl 282. Pawl 290 includes a tooth 292. As illustrated, the inertial mass is a standing man inertial mass. When the vehicle is subject to a deceleration above a predetermined limit, the standing man's mass tips over and lifts the tooth of the sensor pawl 282 upwardly to move pawl 290 into contact with, for example, a ratchet wheel of a web sensor or of the lock ring. This action initiates the movement of the lock cup and then moves the lock pawl into locking engagement with the teeth 232 of the lock wheel 230.

Figure 13:
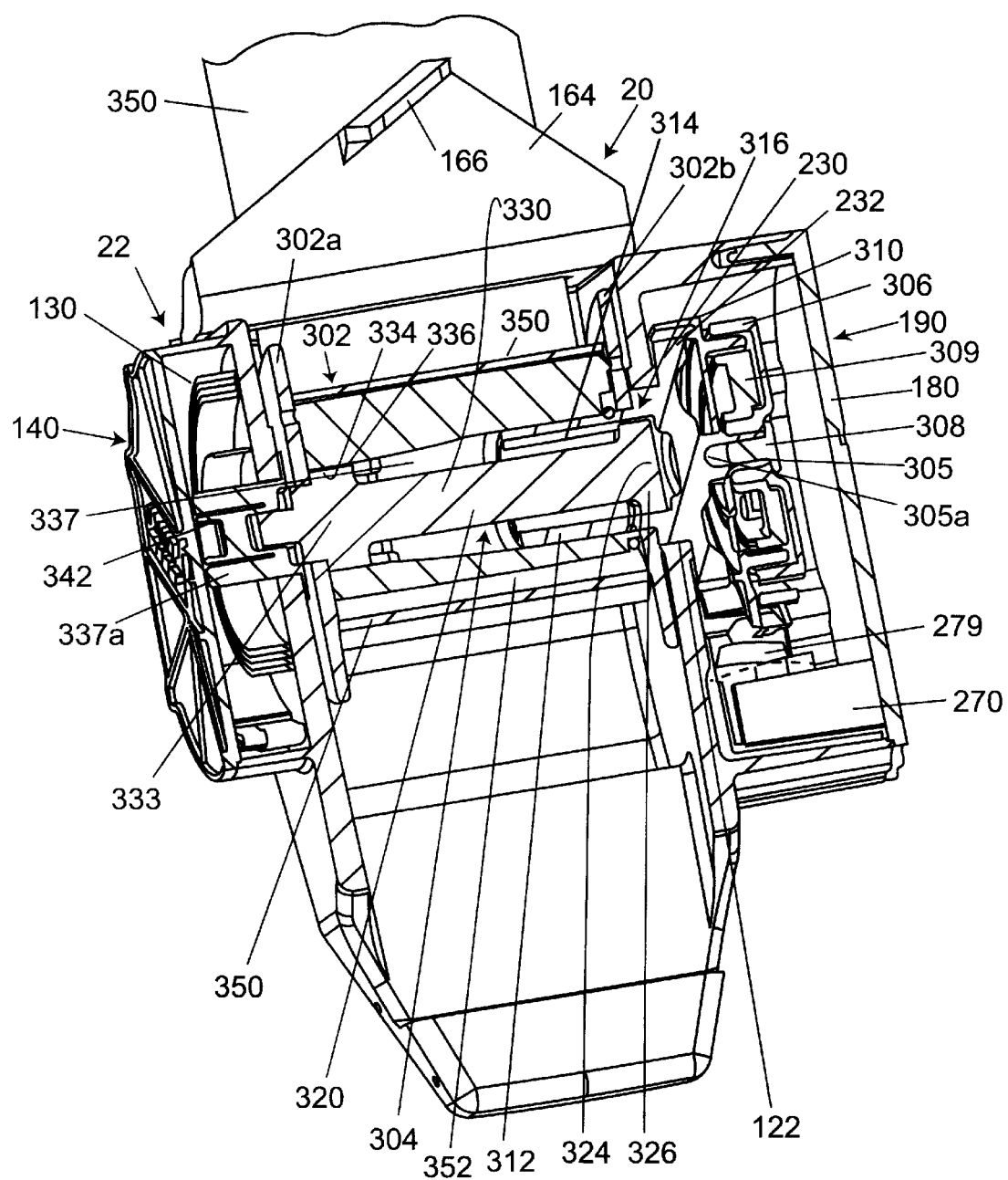
FIG. 13 shows the major features of a spool and shaft assembly of the retractor.

Reference is made to FIG. 13, which includes a cross-sectional view of a spool and shaft assembly 300 of the retractor which is supported by the frame 22. FIG. 13 also shows the frame, in substantially the same orientation as shown in FIG. 7. The assembly 300 includes a spool 302, which is supported by a shaft mechanism generally shown as 304. In this embodiment of the invention, the shaft mechanism 304 comprises a lock wheel sub-assembly 310 comprising a hollow body 312 having splines 314 therein, a larger diameter portion 316 is supported on the opening or bushing 122 of the frame, and the lock wheel 230 which, as mentioned, includes a plurality of locking teeth 232. The lock wheel 230 also includes a splined stub axle 305 on which a toothed ratchet wheel 306 is secured by a pin 308. The stub axle includes a small bore 305a, which receives a pin 308 that is used to hold parts of the web sensor together, in a known manner. Various toothed members 309 of the web sensor are housed with the ratchet wheel 306 also in a known manner. The lock ring 310 mentioned above is rotatable about the stub axle 305. In the illustrated embodiment, the shaft mechanism 304 is additionally formed using an optional torsion bar 320. The torsion bar includes a first end 324 that has a plurality of splines 326 which drivingly engage with the splines 314 of the lock wheel sub-assembly 310. The torsion bar 320 includes a middle portion 330 and a second end 333. End 333 is formed with splines 334, which engage splines 336 formed within a hollow bore 337 of the spool 302. In this manner, the lock wheel sub-assembly 310 rotates with end 324 of the torsion bar while the spool 302 rotationally moves with end 333 of the torsion bar. The torsion bar 320 can be replaced by a less compliant metal shaft member. In this case, the less compliant member can be formed as an integral part of the lock wheel sub-assembly 310. Further, the exterior of the body 312 can also be formed with splines to provide additional support to the spool 302.

During assembly, the spool 302 is inserted through the open top of the frame and then the lock wheel sub-assembly 310 (with the torsion bar inserted therein) is inserted through opening 122 into the bore 337 of the spool. The end 332 of the torsion bar is received within a spring arbor 337a, which had previously been placed in frame opening 120 and secured to the spring 130.

The end 333 has two recesses 340a,b into which are received mating projections 341a and 341b, which are formed about the cup-shaped recess interior of the spring arbor (see FIG. 8). As mentioned, the spring arbor 337 further includes at least one slot 342 (see FIG. 13) to receive the inner end of the rewind spring 130. A length of seat belt webbing 350 is wound about the spool 302. One end of the webbing (not shown) is secured in a slot 352 of the spool using a folded-over portion or a small pin, which is wedged in the slot 352. The spool 302 may include radially extending flanges 302a and 302b to guide the webbing 390 as it winds about the spool.

As mentioned above, the embodiment shown in FIG. 13 utilizes a torsion bar. The torsion bar is illustrative of a class of energy absorbing or dissipating seat belt retractors including one or more torsion bars and one or more crush bushings, as well as seat belt webbing that has a variable elongation characteristic. These energy absorbing retractors share a performance trait in that the reaction force at the spool is limited by the energy absorbing level of the torsion bar, crush bushing or variable elongation webbing. Consequently, the level of force imparted to the lock pawl is similarly limited. For example, for a typical torsion bar retractor, the force level would be in the vicinity of about 4–12 Kn. While the preferred embodiment of the invention, that is the plastic frame will be used with an energy absorbing mechanism of some variety, due to their resulting load limiting factors, the use of the plastic frame is not so limited. The present invention can be used with or without these energy-absorbing mechanisms. As mentioned above the torsion bar can be replaced with a conventional shaft.

Figure 14:
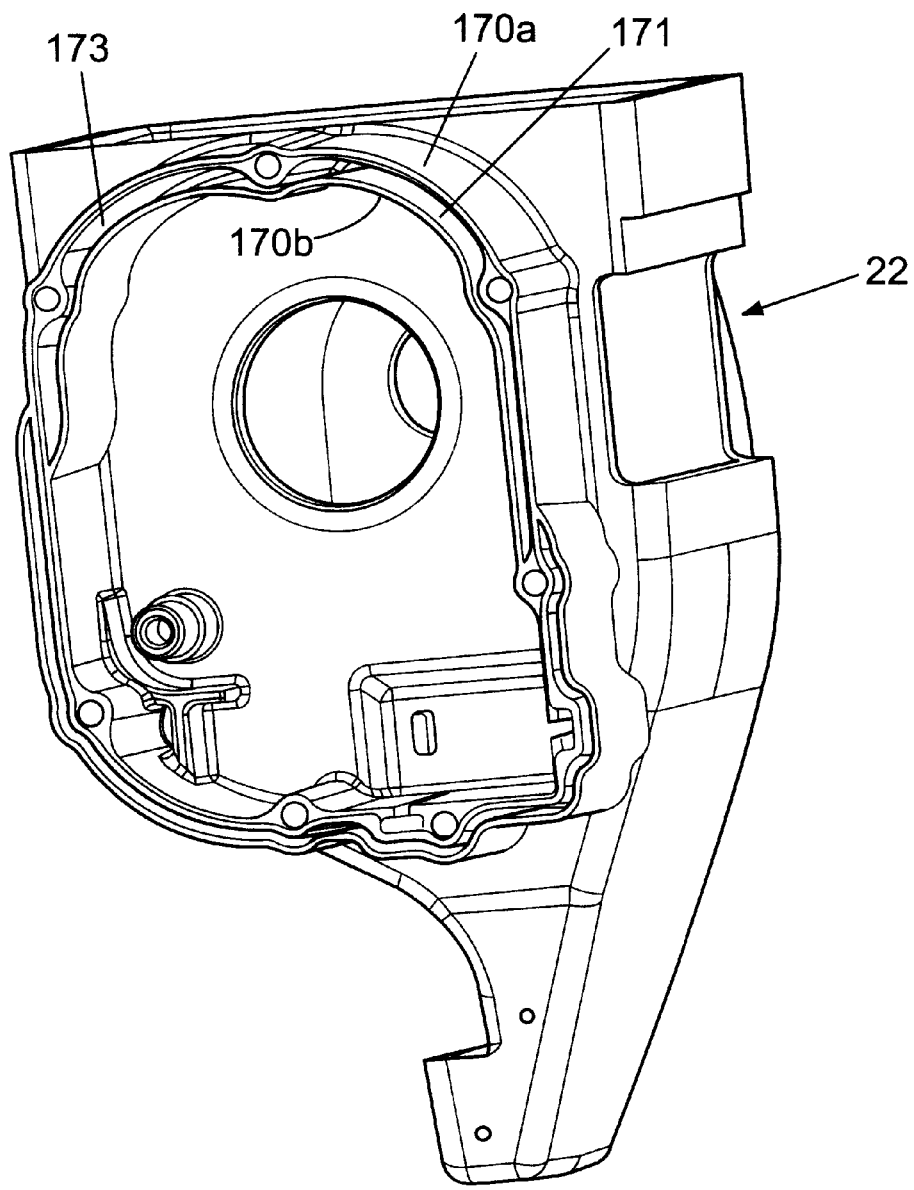
FIG. 14 shows a further embodiment of a frame.

Reference is briefly made to FIG. 14, which shows a further embodiment of the invention. More particularly, the mechanism wall 170 is formed with an inner 170a and an outer 170b wall defining a space 171 therebetween. As illustrated, the space 171 need not be continuous but may be segmented by some of the fasteners 132. As can be appreciated, the outer wall 170b can completely envelop the inner wall and the fasteners 132 and can be segmented or non-segmented (or generally open) so as to provide for an uninterrupted space 171. As before, the wall or, in this case, both the inner and outer walls are enclosed by a mechanism cover 190. The space 171 provides a means for reducing the level of acoustic sound emitted by operation of the movable parts of the vehicle sensor and web sensor. Further attenuation can be achieved by filling the space 171 with a sound-absorbing material 173 including a lightweight foam or a dense thixotropic material. Additionally, the body of the cover 190 can be made hollow and filled with sound-deadening material to further enhance the sound qualities of the retractor.

Figure 15:
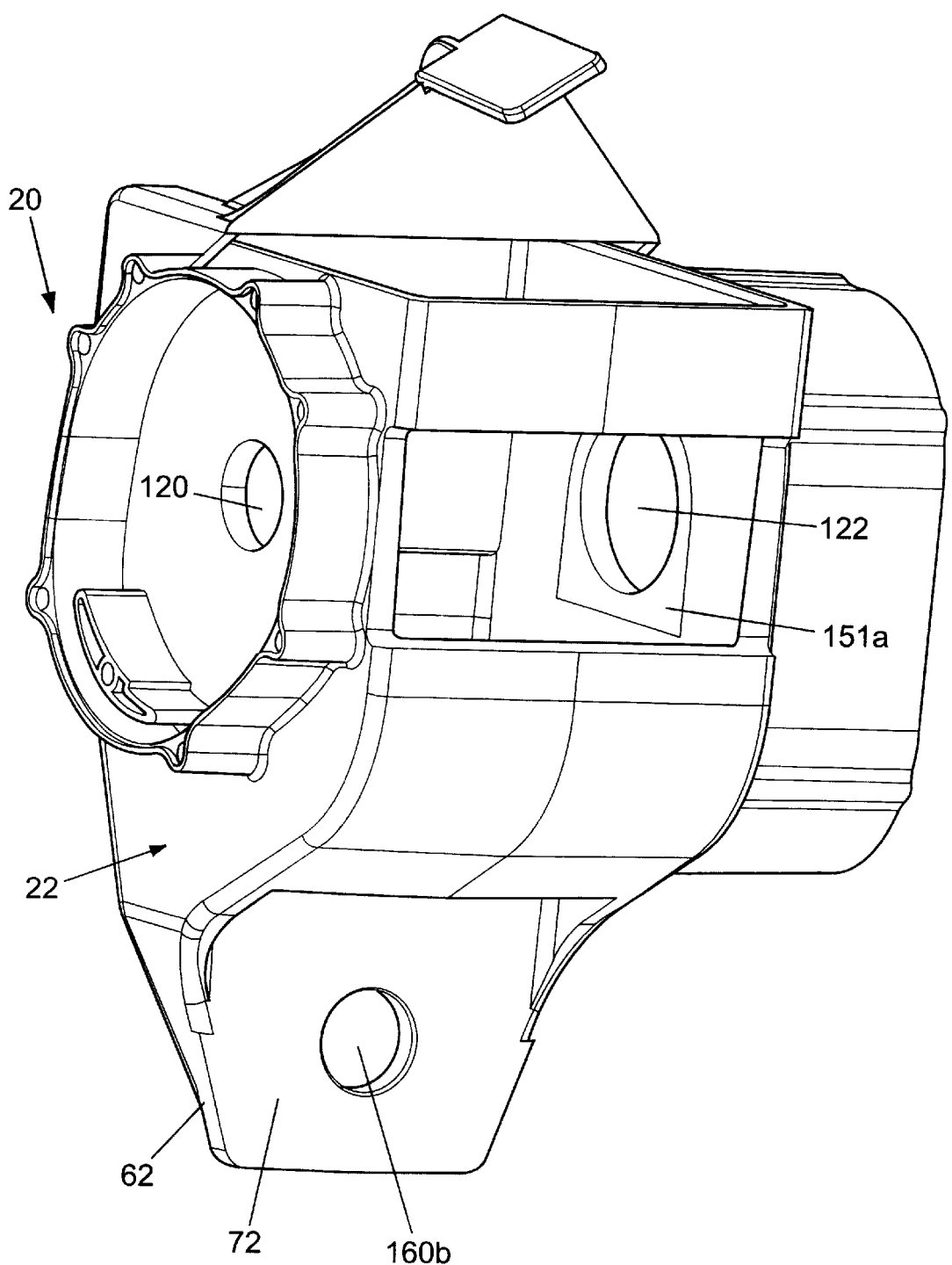
FIG. 15 shows an alternate mounting member.

In FIG. 15 the hook-like lower mounting 160b is formed as opening 160b. A threaded fastener is used to secure the lower portion of the frame to the mounting surface 90.

Many changes and modifications in the abovedescribed embodiment of the invention can, of course, be carried out without departing from the scope thereof. Accordingly, that scope is intended to be limited only by the scope of the appended claims.

What is claimed is:

1. A seat belt retractor (20) characterized by low operating noise, and increased dust, corrosion and moisture resistance comprising:

a frame having a main body (24) and at least one mounting member (60);

a pin, formed as a unitary part of the frame, adapted to support a force transmitting element including a rotary mounted lock pawl;

wherein the frame is provided with a means for permitting the unitary pin to flex in response to reaction forces generated through the lock pawl, the lock pawl moving as the pin flexes.

2. The retractor as defined in claim 1 wherein the frame includes a distributing structure, integrated within the frame and initially spaced from the pawl and contacted by the pawl as the pin flexes to distribute reaction forces throughout the sides of the frame.

3. The retractor as defined in claim 2 wherein the distributing structure includes a strut of unitary construction that links opposing frame sides and includes an extending portion positioned below the lock pawl to receive and support the lock pawl as the pin deforms.

4. The retractor as defined in claim 1 wherein the frame is made from a polymer having at least a 50% content of glass fibers.

5. The retractor as defined in claim 1 wherein the frame is of a one-piece construction and additionally includes a main body (24) which has secondary features including: a spring wall (140) defining a spring cavity for receipt of a rewind spring (130).

6. The retractor as defined in claim 5 wherein the secondary features include a vehicle sensor support formed as a unitary part of the frame.

7. The retractor as defined in claim 5 wherein the main body is quadrilaterally shaped.

8. The retractor as defined in claim 1 further including force limiting means for limiting the forces applied to the frame through a seat belt to less than or equal to a first level.

9. The retractor as defined in claim 8 wherein the force limiting means includes a torsion bar.

10. A seat belt retractor (20) characterized by low operating noise, and increased dust, corrosion and moisture resistance comprising:

a frame having a quadrilaterally shaped main body (24) and at least one mounting member (60); and further including a lock wheel with a plurality of teeth and a lock pawl with at least two lock teeth adapted to engage corresponding teeth on the lock wheel, and wherein the lock pawl includes first means for enabling the lock pawl to flex under determinable crash loads, wherein in response to such flexing, both teeth of the lock pawl engage a corresponding tooth of the lock wheel.

11. The retractor as defined in claim 10 further including force limiting means for limiting the forces applied to the frame through a seat belt to less than or equal to a first level.

12. The retractor as defined in claim 11 wherein the force limiting means includes a torsion bar.

13. A seat belt retractor comprising:

a lock wheel having a plurality of teeth and a lock pawl for lockingly engaging the lock wheel, means for moving the lock pawl from a disengaged position into engagement with the teeth of the lock wheel, the lock pawl including at least two lock teeth adapted to engage corresponding teeth on the lock wheel, and wherein the lock pawl includes first means for enabling the lock pawl to flex under determinable crash loads, wherein in response to such flexing, both teeth of the lock pawl will engage a corresponding tooth of the lock wheel.

14. The retractor as defined in claim 13 including a frame formed of a resin, reinforced material, the frame including a pin (210) for rotationally supporting the lock pawl, wherein the pin is provided with a means for permitting the pin to flex in response to reaction forces generated through the lock pawl.

15. The retractor as defined in claim 14 wherein the frame includes a distributing structure to distribute pin reaction forces without the sides of the frame.

16. The retractor as defined in claim 15 wherein the distributing structure includes a strut (252) that links opposing frame sides and includes extending portions positioned below the lock pawl to receive the lock pawl as the pin deforms.

* * * * *